United States Patent [19]

Shirley, Jr. et al.

[11] 4,424,176

[45] Jan. 3, 1984

[54] PROCESS FOR GRANULATION OF MOLTEN MATERIALS

[75] Inventors: Arthur R. Shirley, Jr., Florence; Frederick T. Carney, Jr., Anderson, both of Ala.

[73] Assignee: Tennessee Valley Authority, Muscle Shoals, Ala.

[21] Appl. No.: 427,723

[22] Filed: Sep. 29, 1982

[51] Int. Cl.$^3$ ............................................. B01J 2/12
[52] U.S. Cl. ........................................ 264/7; 264/14; 264/117
[58] Field of Search .............................. 264/7, 14, 117

[56] References Cited

U.S. PATENT DOCUMENTS

| | | | |
|---|---|---|---|
| 3,231,413 | 1/1966 | Berguin | 264/7 |
| 3,398,191 | 8/1968 | Thompson et al. | 264/117 |
| 3,877,415 | 4/1975 | Blouin | 427/424 |
| 3,936,534 | 2/1976 | Schallis | 427/215 |
| 4,213,924 | 7/1980 | Shirley | 264/7 |
| 4,217,127 | 8/1980 | Kono et al. | 427/213 |
| 4,219,589 | 8/1980 | Niks et al. | 427/213 |

Primary Examiner—James R. Hall
Attorney, Agent, or Firm—Robert A. Petrusek

[57] ABSTRACT

The granulation of molten material using a heat transfer process whereby solid particles are heated, dried, or cooled by a gas: Particles are repeatedly lifted and dropped as, for example, in flighted rotary drums. By forced recirculation, gas is passed through showering particles generally perpendicular to their plane of fall. Examples show gas forced to contact particles in this manner imparts an overall volumetric heat transfer coefficient to a rotary drum superior to that expected from classical literature or presently operating rotary drum heat exchangers. Disclosure teaches gas temperature adjustment between forced recirculations. Technique usage will reduce exchanger capital cost, increase energy efficiency, and reduce pollution problems. Also, prewetting of the particles in certain instances can be utilized to effect substantially increased pseudo volumetric heat transfer coefficients when cooling non-hygroscopic materials.

17 Claims, 2 Drawing Figures

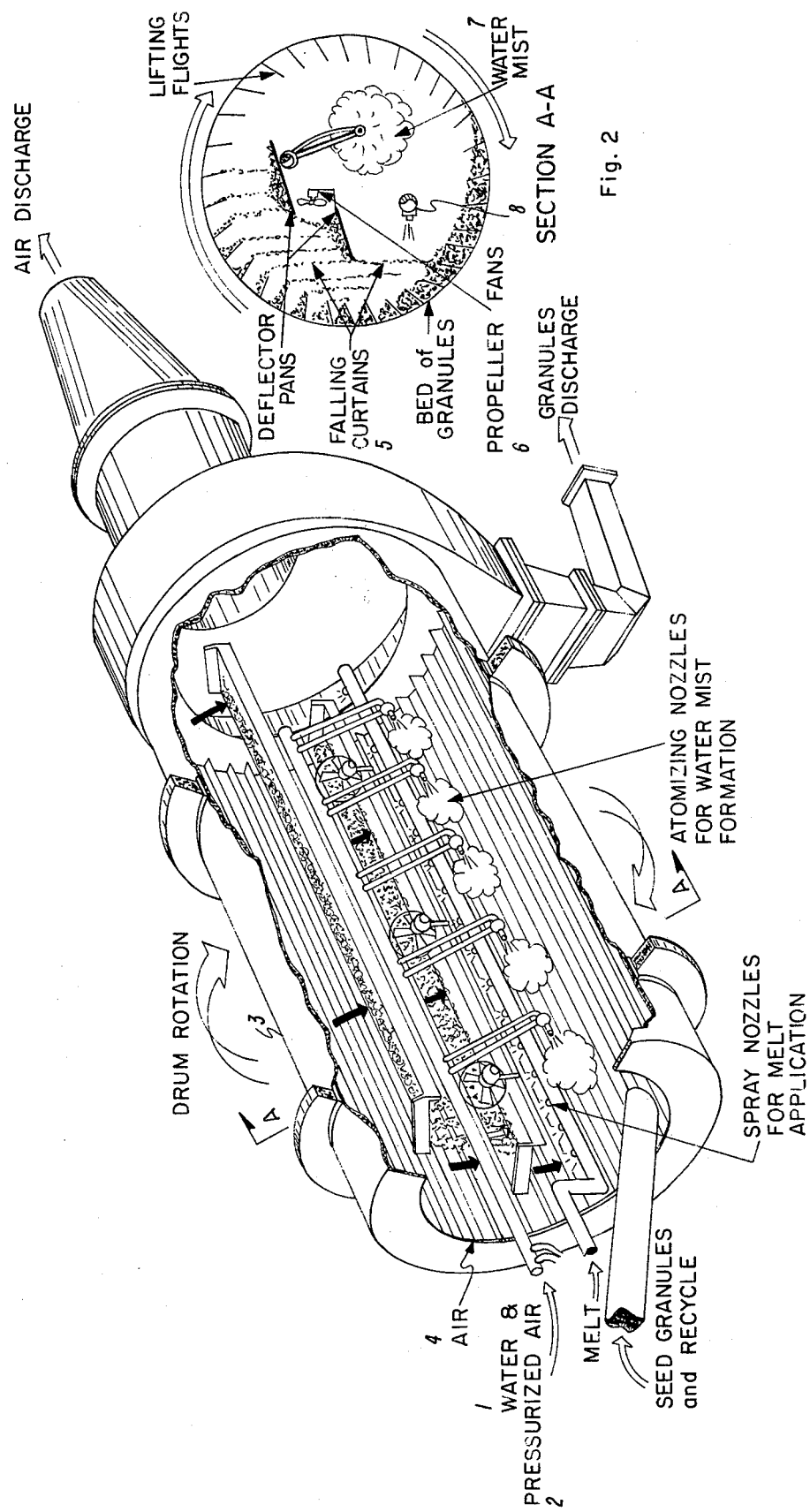

PROCESS FOR GRANULATION OF MOLTEN MATERIALS

INTRODUCTION AND BACKGROUND OF THE INVENTION

The present invention relates to an improvement in granulation using heat transfer technology whereas heat can be assimilated or dissipated from granules or other solid particles by convection at a remarkably rapid rate, in an extremely energy efficient manner, and with a reduction in pollution potential by particulate emissions, while maintaining a safer and more secure environment for those involved with the operation. Specifically the invention relates to heating, cooling, or drying granular or solid particles, as apart from liquid particles, while in a state of fall in a partially or totally enclosed container such that the rate of heat transfer to or from the granules or solid particles is high and the efficiency of the energy used in effecting the heat transfer is enhanced by forced recirculation of gas through the mass of falling solid particles by the use of gas movers mounted inside the container to pass gas through the mass of falling particles. More specifically, the present invention relates to an improvement in melt granulation processes wherein the heat released in crystallization of the melt and associated heat from cooling of the melt and subsequently solid material must be dissipated in some manner. Most specifically, it is a significant improvement of the invention disclosed earlier by Shirley in U.S. Pat. No. 4,213,924, issued July 22, 1980. In most cases the technique can also be applied to encapsulation and coating processes. Further, the present invention can be used in conjunction with existing technology to obtain greatly improved heating, cooling, and drying efficiencies and capacities from equipment whose design has been modified to use the invention which is disclosed herein. The process, procedures, and equipment of the invention apply to granulation of hygroscopic materials as well as those which are nonhygroscopic and to the heating, cooling, and drying of almost all solid particles.

In particular, the present invention relates to a process for the granulation of materials, using heating or cooling of solid particles in an enclosed vessel, such as a rotating drum wherein gas can be ventilated through said vessel and wherein by means of this invention, as the gas passes through the vessel, the gas can be forced to repeatedly contact the solid particles being heated, cooled, or dried. In specific cases as described in the examples presented later, air is used and it can be cooled by evaporation of water between forced contacts with the solid particles to increase the heat transfer rate and capacity of a rotary drum granulator. Those acquainted with the art of heat transfer can readily see that this type of technique also can be used to improve the heat transfer rate and capacity of a rotary drum heater or dryer by heating the air between forced contacts with the solid particles. The technique works best in a rotary drum in which lifting flights are present but which, when in operation, does not shower granules throughout the cross section as disclosed by Thompson et al in U.S. Pat. No. 3,398,191, issued Aug. 20, 1968, but rather is similar to Blouin's disclosure in U.S. Pat. No. 3,877,415, issued Apr. 15, 1975, in which a deflector pan or pans gather showering curtains of solid particles together in a continuous falling curtain. The earlier Shirley disclosure U.S. Pat. No. 4,213,924, supra, shows how such a rotary drum design can be used to create an area in the cross section of the rotary drum extending throughout the length of said rotary drum where water mist can be sprayed for evaporative cooling of air. A three dimensional space in a rotary drum or an enclosed or semi-enclosed container for purposes of clarity shall be henceforth defined herein as a section of said rotary drum or container. Those knowledgeable in the art of heat transfer can readily see that the same section which in one case might be used to cool air or some other gas could be used to heat same by direct contact with a heat source should it be advantageous to constantly or intermittently supply heat to the ventilating gas for any reason as it passes through the rotary drum, such as might be the case in a co-current or counter-current dryer.

Those acquainted with the art of granulation utilization drying and heating will quickly appreciate the advantages this invention offers in heating or drying heat sensitive solid particles at improved heat transfer rates with efficiency and without risk of overheating of the material.

Those skilled in the art are well aware of heat transfer technology as it applies to fluid beds and spouted-fluid beds such as have been disclosed by Niks et al in U.S. Pat. No. 4,219,589, issued Aug. 26, 1980, and by Kono et al in U.S. Pat. No. 4,217,127, issued Aug. 12, 1980, respectively. Fluid-bed technology is recognized to be one of the best heat transfer means between a gas and solid particles. The heat transfer rates within the bed are exceptionally high. A primary object of the instant invention is to emulate this extremely effective means of heat transfer by convection between gas and solid particles while overcoming several inherent problems of heat transfer in fluid-bed units. In true fluid-bed units, energy usage is quite high because of pressure drops across the gas distribution plate, bed of fluidized solid particles, pollution abatement equipment, and associated ductwork; and heat transfer efficiency, although quite good by some standards, is extremely low when measured by those of the instant invention. Fluid-bed units do not lend themselves to reuse of the air blown through a bed, although it is done in several multibed designs, but usually at great expense in fluidizing energy. It is also possible to pass exit gas through cooling and/or heating devices and return said gas through additional portions of the same fluid bed but usually this is associated with expensive cyclone and/or bag collectors to prevent solid particles from plugging the gas distribution screens.

The prior art also teaches the use of closed convection systems such as ovens where gas is blown lightly through porous beds of solid particles sometimes supported on traveling grates or screens. The gas can be reheated or cooled, and then recycled through the solids. This overcomes some of the fluid-bed problems in that it normally reduces gas usage and sometimes pressure drops involved in blowing the gas, but it introduces other problems such as much poorer gas and solid particle contact due to channelizing, reduced exposed surface of the solid particles, and more uneven cooling and heating.

In addition to the fluidized bed and the closed oven methods, supra, a third classical means of effecting heat transfer between gas and solid particles is the rotary drum or kiln. The rotary drum serves as an elevator lifting granules up by using flights and letting the solid particles fall back to the bottom of the unit through gas blown from one end of the rotary drum to the other. Kilns usually do not have lifting flights and therefore have even poorer heat transfer characteristics. Many efforts have been made to improve rotary drum heat transfer, but heat transfer rates have remained low, and the rotary drum units have remained inefficient and energy intensive.

The present invention amalgamates most of the best properties or characteristics of these systems into one superior means of effecting heat transfer between gas and solid particles. It is felt that this has been accomplished through the instant innovative approach. From the fluid bed was borrowed the principle that gas blowing through suspended solid particles in a more or less dense phase, as in a fluid bed, is the best means of contact for heat transfer purposes and not as gas contact occurs in long rotary drums where gas flow is axial sometimes passing through but mostly flowing parallel to the showers of falling solid particles. The present invention involves using falling solid particles usually formed into a multiplicity of curtains which approaches the dense phase characteristics of a fluid bed, but not characteristic of a typical rotary drum. Gas is passed through the curtains at angles greater than 45° with the fall line of the solid particles to effect better mixing of gas and granules than can be effected in a typical rotary drum. Because fluidization of solid particles by gas is energy intensive whereas mechanical lifting can be much more economical, the use of a rotary drum for test work was chosen. It was recognized that other mechanical lifting devices such as a cleted conveyor, bucket, or flighted elevator, or any number of similar transport devices which can be part of an enclosed or semi-enclosed system, such as a rotary drum, or can be put into a partially or totally enclosed container may be used to effect heat transfer by the instant disclosure. Solid particles lifted vertically to be released to shower through the drum of container unimpeded or fashioned by baffles and/or screens or other devices into various patterns of falling material all are within the spirit, if not the content, of this disclosure. In some cases, solid particles may be lifted by mechanical means but not released to make a true fall. The conveying device will lower tham in such a manner that the solid particles are essentially loose from each other and have an excellent position for effective convective heat transfer, but retained by restraining screens, open weave fabric, or slotted plates to prevent scattering while allowing air circulation through the solid particles. This practice would also be within the spirit of this disclosure. As in forced convection oven technology, the endeavor was to recycle the gas through the solid particles to achieve minimum discharge of gas from the system and thus avoid the use of energy to heat or cool gas expelled to the atmosphere or otherwise lost to the process and to avoid the power involved in passing much larger quantities of gas through pollution abatement equipment. In many cases, no gas flow through the container is needed; this is especially useful when heating or cooling with inert gases such as nitrogen or carbon dioxide. The present invention makes this possible because gas moving devices are positioned to blow or exhaust gas in a manner that said gas penetrates the cascading and falling solid particles and returns to the section of the container not filled with falling solid particles to be heated, cooled, humidified, or dehumidified, if needed, before being passed through the solid particles again.

One embodiment of this invention is now in operation, incorporated in a urea granulation pilot plant capable of three tons per hour, at the Tennessee Valley Authority in Muscle Shoals, Ala., and is being incorporated in the design of a 14 ton-per-hour plant under construction at the same location. The invention holds great promise for melt granulation and will no doubt take its place quickly as a major innovation in that area; but the most dynamic aspect of this disclosure is the effect it will have on the total chemical process industry throughout the world wherever solid particles must be heated, dried, cooled, coated, or granulated.

SUMMARY OF THE INVENTION

According to the most specific embodiment of the present invention, air is forced to recycle through curtains of falling granules formed by the movement of lifting flights in a rotary drum granulator to improve the overall volumetric transfer coefficient in the granulator. Molten material is sprayed onto seed granules of an identical substance or of another substance such as would be formed in an encapsulation process. The spraying takes place in the rotary drum. Closely spaced lifting flights and multiple deflector pans allow excellent dispersion of the granules within the atmosphere of one large section of the granulator. Water is finely atomized in a section of the granulator which is free from falling granules such that the water is allowed to quickly evaporate into the granulator's atmosphere without directly contacting the material being granulated. The heat of vaporization needed to evaporate the water is taken from the air, thus cooling it; then the air is forced by fans such as, for example, of the propeller type, into the sections of the rotary drum filled with falling granules where the air contacts the granules, cooling them and heating the air. The heat of vaporization, for purposes of this disclosure, will be defined as the heat required per unit of mass of a given liquid at its temperature of vaporization for complete conversion of that liquid to a gas at the same temperature, even though this temperature may not be the liquids boiling point. The hot air is subsequently and alternately heated and cooled as it passes through the rotary drum and is repeatedly forced by the fans to recycle through the section filled with falling granules and the section filled with water mist. The moisture content of the air is regulated at values lower than the critical humidity of the granules and at values such that condensation will not take place in the air or on any of the internals of the granulator. To prevent degradation to the product, for example, by whirling propeller type fan blades, the air-moving devices are mounted in sections of the granulator not subjected to falling granules and, to prevent excessive moisture contact with the blades, they are mounted out of the section where water is atomized. Although it is obvious to those acquainted with the art of granulation that this means of heat removal is well suited to batch type granulation, the examples which are given later in this disclosure refer specifically to a continuous process in which seed granules are continually fed to the unit, molten material is continually sprayed onto the seed granules, and product is continually discharged from the granulator. The product leaves the granulator as dry, hard, spherical granules.

BRIEF DESCRIPTION OF THE DRAWINGS

FIG. 1 is a pictorial view of the granulating device showing the relative positions of the water atomizing nozzles, granule deflector pans, and propeller type fans.

FIG. 2 is a feed end view of the granulating device again showing the relative positions of the water atomizing nozzles, granule deflector pens, and propeller-type fans as observed taken through Section A—A of FIG. 1.

DETAILED DESCRIPTION OF THE INVENTION

Referring now more specifically to FIGS. 1 and 2 in the process of the present invention, water 1 is atomized to a fine mist by air 2, or other means of injection, into a rotary drum granulator 3. Air 4 is pulled through the rotary drum co-current with the flow of granules. Simultaneously, the air is being circulated through the falling curtains of granules 5 by propeller type fans 6, which blow the air through the curtains and subsequently out into the section 7 of the rotary drum filled with the fine mist of water. Those acquainted with the art of psychrometrics will recognize that the invention is still operational if the air is pulled countercurrent to the solids flow provided the incoming granules are not cooled to a point sufficiently below the normal granular temperature in the drum which allows condensation or absorption of moisture into the granules. Further, those acquainted with the art of psychrometrics will recognize that the fans may be positioned to pull air out of the falling granules and blow it into the section of the drum occupied by the water mist; however, when this technique is used, water mist is likely to be blown into contact with the shell of the rotary drum and result in wetting of the shell and buildup problems associated with it. As the water mist evaporates into the air, the heat of vaporization of the water indirectly through the medium of the air removes the heat of fusion of the molten material which is also sprayed 8 into the drum and which is solidifying.

OBJECTS OF THE INVENTION

It is therefore an object of the present invention to substantially increase the amount of heat transferred from granules to air in a given size granulator without resorting to excessive flows of air passing through the granulator in contrast to the invention of Schallis (U.S. Pat. No. 3,936,534) and Berquin (U.S. Pat. No. 3,231,413).

Another object of the present invention is to keep the water mist away from the granules and the sprays of molten material such that water does not impinge on the granules nor the sprays of molten material or in any manner come in direct contact with either of them.

Still another object of the present invention is to exercise control over the humidity of the air as it flows through the drum such that it not be allowed to get above the critical humidity of the product being granulated, nor should the wet-bulb temperature of the air anywhere in the drum be allowed to reach a temperature at which condensation would occur on any of the internals in the granulator.

DESCRIPTION OF THE PREFERRED EMBODIMENTS

It is important for maximum efficiency that the rotating drum be equipped with many lifting flights equally spaced on its inside shell. The drum used in development work as specifically shown in FIGS. 1 and 2, supra, had 40 lifting flights spaced at 9-degree intervals on the inside shell of the drum. The flights were 3 inches wide and 9 feet long. They were installed parallel to the axis of the drum, and they were canted 15 degrees forward from the perpendicular with the shell of the drum. Two deflector pans, as described in Blouin U.S. Pat. No. 3,398,191, supra, were installed, but the double pan installation arrangement was not identical to that described by Blouin. The deflector plate described by Blouin was not used. Blouin's apparatus makes an excellent granulator for use with the present invention, but the invention is certainly not limited to its use. There are certain features of Blouin's apparatus which enhance the process. For example, a deflector pan forms a roof over a portion of the inside of the drum under which water atomizing nozzles can be placed. In an improvement over Blouin's apparatus, the two deflector pans were mounted so that the planes they formed were approximately parallel to one another. The top pan was 2 feet 2 inches wide and 9 feet 4 inches long. The lower pan was 1 foot 9 inches wide and 9 feet 6 inches long. Both pans were sloped counter to the direction of rotation of the drum at an angle of 35 degrees and 30 degrees, respectively, so that the granules caught by the pins cascaded down them. Each pan caught some of the material discharged from the flights. All granules discharging from the top pan fell to the bottom pan. Besides providing a curtain of falling granules on which the molten material was sprayed, the pans provided a large section of the granulator in which heat transfer could occur by air to granule contact but without allowing the granules to pass through the water sprays located underneath the pans. The deflector pans caught the granules after only a short fall, thus breaking the momentum of the granules before they could develop enough force to shatter on impact and create dust. The double-pan configuration was primarily designed to increase airflow between the water evaporation section of the granulator and the section where most air-to-granule contact occurred. Propeller type fans driven by air motors were mounted underneath the top pan to blow air from the water evaporation section of the drum to the section filled by falling granules. As air was blown through the curtain of falling granules and the subsequent backup curtains, excellent air to granule contact occurred allowing the air to quickly and effectively absorb heat from the granules. The air passed through the dense area of falling granules and was discharged from the falling granule section, some by passing over the top pan and some by passing under the bottom pan and through the curtain of falling granules which that pan created. The air which was quite hot at this point then circulated through the cooling section occupied by water sprays to be cooled by evaporation of water into it before being recirculated by the fans to the section of falling granules. The flow of air was further enhanced by orientation of the water spray nozzles to spray approximately parallel to the axis of the drum and countercurrent to the movement of air through the drum. By this orientation the water spray patterns became baffles causing a further increase in interchange of air from the cool sections of the drum to the hot sections of the drum; the latter being the section occupied by falling granules, the section along the inside shell of the rotary drum, and the section just above the rolling bed of granules. In fact, substantial air interchange is accomplished without the use of internal fans by the baffle effect of the pneumatic water atomizing nozzles.

In an earlier disclosure U.S. Pat. No. 4,213,924, supra, the movement and interchange of air between the hot and cool sections of the drum occurred because of the blowing action resulting from the flights of the drum and the movement of granules in the drum. The instant invention allows for substantial improvement over our previous granulation technology, such as significant reductions in cooling air and associated energy requirements and/or major increases in capacity of an existing granulator using our previous process by the simple but innovative alteration of the deflector pans, the installation of internal air movers, and providing additional water spraying capacity oriented to spray in a direction opposite of the resultant flow vector of the cooling air. It is obvious that those acquainted with the art may wish to use other means of forced air movement than propeller fans such as air eductors and ejectors, axial fans, squirrel cage fans or some other means, all of which are within the true spirit and scope of this disclosure. In a large granulator, a prectitioner of this technology may wish to install three or four deflector pans such that the urea cascades from one pan to the next and thus additional positions are created to allow air movers to be positioned so that they may blow through falling curtains back into the section of falling granules. It is further envisioned that those acquainted with the art of heat transfer will realize the unique possibilities of using this technology in cooling material in other processes not involving granulation in which the countercurrent movement of air through the rotary drum with relation to the movement of solid particles will be advisable to prevent moisture condensation on the solid particles or on cool portions of the internals of the rotary drum.

In many cases, existing plants as well as future plants can make use of this unique improvement to rotary drums, heaters, coolers, granulators, and dryers. When used in combination with Shirley's earlier disclosure U.S. Pat. No. 4,213,924, supra, it will have a profound effect on granulation technology, such as significant reductions in cooling air and reduction or elimination of recycle and supporting coolers, screens, and refrigeration systems. In doing this, the capital cost of a granulation plant will be lowered. Energy requirements will be reduced as a result of handling less recycle and less cooling air. Dust generation will be less and subsequently recovery of potential pollutants will be easier. Alteration of many prior-art granulation units will be simple, such as removing or altering all or a number of the lifting flights or reversing their lift angle and installing pans, air movers, and water spray nozzles. This, in some cases, will result in a major increase in production capacity with no increase in energy consumption or involvement of additional major plant equipment. Simultaneously, process control may be improved and a product produced with better physical characteristics.

Those acquainted with the art of heat transfer can readily understand the advantages of providing intensive air movement substantially perpendicular to the axis of the drum into curtains of falling granules, while adding heat in a continuous or intermittent manner throughout the length of the drum. By this means, the heating and drying of solids can be accomplished in the same manner as we have described for cooling of solids. Heat can be added in the section, free from falling granules, in the form of a direct flame, steam addition, electrical cal-rods, or some other manner or direct energy addition. Heat can also be added in an indirect manner through heat exchangers using steam, some other gas, or a liquid heat transfer medium. Cooling can also be effected in an indirect manner such as installation of expansion valves and heat exchangers or the circulation of cold liquid through heat exchangers in the drum. In some cases, improved heat transfer can be obtained by supplying some of the heating or cooling, either directly or indirectly, within the section of falling granules and this can be done without departing from the teachings or spirit of this invention.

When cooling or heating is supplied to a drum or container through an indirect manner such as through fin-tube heat exchangers there may be need for forced circulation of air through the indirect cooling and heating units in conjunction with forced circulation of air through the falling granules. That, in fact, may be very advisable in some cases since the heat exchange between air and solid particles will be very rapid when using the technology of this disclosure possibly making the heat exchange between the indirect heat source or sink and the air a major controlling factor in heat transfer of the total system. The use of air movers which circulate air or some other gas through both the heat exchangers and the falling granules at once is certainly within the spirit of this disclosure and is in fact advised. The orientation of the heat exchangers, however, may require separate air moving systems, one to serve primarily the falling granules and the other to serve the indirect heat exchangers. This, too, is within the spirit of the present invention.

THEORY OF THE INVENTION

Friedman and Marshall, in their classical work on heat and mass transfer in rotary drum dryers (Chemical Engineering Progress, Vol. 45, pp 482–493, pp 573–588, 1949) show that when heat is transferred between solid particles in a drum and air passing through that rotary drum and in direct contact with those solid particles, the amount of heat transferred to the solid particles from the air can be represented by $$q_M = UaV(\Delta t)_{l.m.} \quad (1)$$

when it is assumed that heat transferred from the air to the solid particles by first passing through the shell of the rotary drum is small, and where there are no heat losses from the rotary drum to the surroundings. In this equation:

$q_M$ = heat transfer rate to the solid particles, Btu/hr.
U = overall heat transfer coefficient between air and solid particles, Btu/(hr)(ft$^2$)(°F.)
a = overall contact area between air and solid particles, ft$^2$/ft$^3$ of rotary drum volume
V = rotary drum volume, ft$^3$
$(\Delta t)_{l.m.}$ = the log means temperature driving force between the solid particles and the air, °F.

In actuality there is some heat loss from solid particles to surroundings through the shell of the rotary drum, and also in actual practice some heat will flow from air to solid particles by passing through the shell of the rotary drum because of alternating contact of the air and solid particles with the shell and the lifting flights of the rotary drum. Therefore, q can be represented by $q_G - q_L$ where $q_L$ = heat losses from the shell of the rotary drum to the surroundings and $q_G$ = the heat transferred from the air passing through the rotary drum. By combining U and $a$ into a single term called $U_a$, the overall volumetric heat-transfer coefficient with units of Btu/(hr)(ft$^3$ of rotary drum volume)(°F.), Friedman and Marshall represented all heat transferred between the solids and the air with a minimum of error. The equation now reads:

$$q_M = q_G - q_L = U_a V(\Delta t)_m$$

where $(\Delta t)_m$ is the true mean temperature driving force between the solid particles and the air along the length of the rotary drum, °F.
Where the rotary drum is a cooler equation 2 becomes:

$$q_G = q_M - q_L = U_a V(\Delta t)_m \quad (3)$$

More familiar but not as specific, the equation is written:

$$q_t = U_a V(\Delta t)_m \quad (4)$$

where $q_t$ = total heat transferred in the drum, Btu/hr
Friedman and Marshall showed $U_a$ to be a complex function of the feed rate, air rate, and physical properties of the material being handled and suggested a scale-up of rotary drum dryer heat transfer capacity based on drum diameter which thus takes into account the surface of the rotary drum and other factors. It is presented below:

$$U_a D/G^{0.16} = 15 \quad (5)$$

where D = the diameter of the rotary drum, ft. and G = the air rate through the rotary drum, lb/(hr)(ft$^2$ of dryer cross section).

Later when Friedman and Marshall authored Section 13 "Drying" in the prestigious 3rd edition of J. H. Perry's *Chemical Engineers' Handbook*, the scale-up formula for rotary drum heat transfer was adjusted to a more conservative $$U_a D/G^{0.16} = 10 \quad (6)$$

In the most recent 5th edition of J. H. Perry's *Chemical Engineers' Handbook*, the scale-up formula for rotary drum heat transfer was again adjusted based on new findings by McCormick [Chemical Engineering Progress, Vol. 58, No. 6, pp 57 (1962)] such that:

$$U_a = 0.5 G^{0.67}/D \quad (7)$$

It should be noted that in the present invention there are typically two heat exchanges going on in the rotary drum. The recycled air is either heated or cooled in the rotary drum by some means and the air then heats or cools the solid particles in the second heat exchange. The equations (5), (6), and (7) refer only to that exchange involving the solid particles.

It can readily be seen by those knowledgeable in heat transfer technology that factors which effect $U_a$ of a rotary drum heater, cooler, or dryer can be extremely important to the total heat transfer capability of a unit. Friedman and Marshall, however, found air flow rates alone only slightly affected the $U_a$ values of a rotary drum heat exchanger, but it was concluded "that the air probably traveled relatively unmixed between the curtains of material in the dryer, and that it was possible for considerable temperature striation to occur." No attempt was made to suggest how to solve this problem.

The present invention has solved this problem, and in so doing, it is anticipated that this solution can revolutionize heating, cooling, and drying within rotary drums. $U_a$ values obtained in our test work with a seven-foot-diameter rotary drum have reached 45 Btu/(hr)(ft$^3$)(°F). Additional air moving capacity should greatly enhance that figure in future test work. It is projected that $U_a$ values could reach 70 Btu/(hr)(ft$^3$)(°F.). Further, because only approximately 30 to 40 percent of the volume of the rotary drum is used to obtain air and granule contact, it can be said that local $U_a$ values for the section filled with falling granules are 2 to 3 times higher than those presented as overall $U_a$ values. This represents a truly remarkable breakthrough in heat transfer technology when it is considered that liberal extrapolation of Friedman and Marshall's data predicts a rotary drum of a seven foot diameter and having mass flow rates similar to those which we used should have a $U_a$ value of only 11 Btu/(hr)(ft$^3$)(°F.). Other design equations respected in the chemical industry predict less. Friedman and Marshall's paper (equation 5 above) predicted 6 Btu/(hr)(ft$^3$)(°F.); and J. H. Perry's 3rd and 5th editions of the *Chemical Engineer's Handbook* (equations 6 and 7 above, respectively) predicted $U_a$ values of 3.8 and 4.2 Btu/(hr)(ft$^3$)(°F.), respectively. Some of the best commercial rotary drum dryers with extremely high mass flow rates of gas and solid particles can presently attain $U_a$ values of 20 to 25 Btu/(hr)(ft$^3$) (°F.) in a seven-foot-diameter rotary drum. However, these values are much more closely predicted by chemical engineering literature because they are attained only by rotary drums with very high mass flow rates. Earlier in this text it was mentioned that a primary endeavor and object of the present invention is to emulate the heat transfer characteristics of a fluid-bed unit while overcoming the problems of that technology. We have found fluid-bed units, when handling similar substance to those we handle, have $U_a$ values of 750 to 1000 Btu/(hr)(ft$^3$)(°F.) when only the volume of the actual fluidizing bed is considered, but when plenum and disengaging section are also considered values are between 50 and 100 Btu/(hr)(ft$^3$)(°F.). Therefore, we have approached the value of fluid-bed overall volumetric heat transfer coefficients in a rotary drum and have overcome the problems associated with fluid beds, because energy consumption is much less per unit of heat transferred.

Estimates based on equal heat transferred indicate that a rotary drum with lifting flights operating strictly as a heat exchanger with the forced recycle of air through falling solid particles by propeller fans, as we have described in this disclosure, would consume only about 50 percent of the energy required by a fluid-bed system to achieve the same solid particle and air discharge temperature provided air flows in the two systems were equal and no internal cooling of air was done in either system. It will be obvious to those skilled in heat transfer technology that if the air passing through the rotary drum is cooled or heated between forced recirculations, as we encourage by this disclosure, the further reduction in energy as well as the reduction in the cost of the system could be very significant. $(\Delta t)_m$ would be increased; therefore rotary drum size could be reduced and mechanical energy in lifting solid particles saved. Air mass flow rates would be reduced and thus less heating or cooling potential would be discarded with the air leaving the rotary drum.

As was pointed out in equations (2), (3), and (4) above, the actual heat transfer rate for a given rotary drum unit is a function of $(\Delta t)_m$ and Ua for said unit. Because the present invention makes it possible to maintain extremely high Ua values by forced recirculation of air and still have 60 to 70 percent of the volume of the drum to adjust air temperature by all suitable means and thus maximize $(\Delta t)_m$ values, it is possible to obtain heat transfer capacities far exceeding normal expectations for a given rotary drum, as will be shown by the following examples.

EXAMPLES

The following examples show how the present invention has taken the above concepts and developed them into a unique method to enhance the granulation of molten materials.

EXAMPLE I

The granulation drum described earlier was used to test the effectiveness of the invention to increase the heat transfer capacity of a given size rotary drum granulator and thus provide increased granulation potential for that granulator by improving the efficiency in heat removal of the air being passed through the granulator. A granulator 7 feet in diameter and 10 feet long was used for the test work. As the granulation drum revolved, lifting flights continuously discharged material onto two collecting pans which gathered the granules together. Granules collected by the upper pan discharged in a falling cascade to the lower pan where they were joined by other granules falling from the flights of the rotating drum. The unit was fitted with three propeller fans having a blade diameter of 15 inches. The fans were positioned so that they blew air almost perpendicularly into the plane formed by the cascading granules falling from the top collecting pan to the bottom collecting pan. In most cases it is important that the air be blown at the cascading granules at as near a perpendicular angle with the fall line of those granules as possible in order to obtain good penetration of air into that section of the drum filled with said granules. It is, however, recognized that air directed into the cascading granules at any angle with their path of descent will be beneficial because any forced contact between air and granules will increase the heat transfer capabilities of the system. The fans were located in the drum such that their center lines were 32 inches, 68½ inches, and 104½ inches from the feed end of the granulator, and they were positioned about 4 inches from the cascading granules. At the beginning of the test, urea was sprayed at 300° F. through 27 hydraulic atomizing nozzles mounted on 3 13/16-inch center lines along the length of the granulator. The nozzles were oriented to spray on the cascade formed by granules falling from the bottom collecting pan. Thus, granulation occurred and heat was injected into the granulator over most of its length. The overall spraying rate was 3520 pounds per hour. Urea recycle and seed granules were fed into the front end of the drum at the rates of 4,000 pounds per hour and 150 pounds per hour, respectively, and with temperatures of 140° F. and 70° F., respectively. To remove the heat given off by solidifying melt and its subsequent cooling to the temperature of the granules in the granulator, room air was pulled through the granulator and water was evaporated into it. The air entered the granulator at a rate of about 3,500 cfm. It had a temperature of 77° F. and a relative humidity of 28 percent. Cooling water at 60° F. was pneumatically atomized into the drum through five nozzles. The nozzles were positioned at intervals of 21 inches along the length of the granulator, with the first nozzle 37½ inches from the feed end of the granulator. With respect to the cross section of the granulator, the nozzles were positioned near the center of the area not filled by falling granules and were oriented to spary in the direction of the feed end of the granulator and, thereby, countercurrent to the entering air. The water spray rate was adjusted to 210 pounds per hour. In the initial phase of the operation, the propeller fans were not energized and all internal air mixing was caused by the flights of the drum, the action of the spray nozzles or the cascading of the granules. The process was allowed to reach equilibrium at which time the temperature of the granules discharging from the granulator was 213° F. The inside shell of the granulator was damp resulting in some buildups. The exhaust hood of the granulator was continually wet with condensing water vapor which dripped into the exiting granules causing large buildups in chutes and equipment downstream of the granulator. The fans were turned on and allowed to circulate about 2000 cfm each. After equilibrium conditions were reached, despite a slight increase to 3,940 pounds per hour in the molten urea spray rate and an accompanying slight increase in the cooling water to 281 pounds per hour, the temperature of the exiting granules dropped to 200° F. The air flow through the granulator remained 3,500 cfm. With the 3 fans on the heat transfer rate, from granules to air was 480,000 Btu/hr, or 126 percent of the maximum heat transfer rate (380,000 Btu/hr) obtained in the drum before the 3 small fans were activated. In addition, with activation of the fans, the condensation on the exhaust hood ceased as well as problems related to it. Dampness and resulting buildup problems on the inside surface of the granulator were eliminated. There was insufficient data on internal drum conditions to allow meaningful Ua values to be calculated in this first test with the 7-foot-diameter rotary drum as equipped with fans. However, it was obvious with the use of fans, the granulation capacity of the plant was no longer limited to about 2 tons per hour by heat transfer, as is shown in example II.

EXAMPLE II

The granulation drum described earlier was again used to test the effectiveness of the invention by granulating urea at the rate of 6000 pounds per hour. The plant was operated as detailed in example I, supra, with the fans activated. The test lasted for a period of 4 hours and was completely successful. The overall spraying rate of the molten urea at 298° F. was 5819 pounds per hour. Urea recycle and seed granules were fed into the front end of the granulator at rates of 6000 pounds per hour and 420 pounds per hour, respectively, and with temperatures of 162° F. and 81° F., respectively. To remove the heat given off by solidifying melt and its subsequent cooling to the temperature of the granules in the granulator, room air was pulled through the granulator and water was evaporated into it as in example I. The air entered the granulator at a rate of about 3250 cfm. It had a temperature of 84° F. and a relative humidity of 38 percent. Cooling water at 65° F. was atomized into the drum as in example I. The water spray rate was adjusted to 304 pounds per hour. At equilibrium conditions the temperature of the exiting granules and air were 221° F. and 182° F., respectively. The heat transferred from granules to air was 642,000 Btu/hr or 169 percent of the maximum heat transfer rate in example I when the fans were off. There were no condensation related buildups on the inside shell of the drum or the exhaust hood. The granulation capacity of the drum was limited by the capacity of the water spraying nozzles and the molten urea pumping capacity. The overall volumetric heat transfer coefficient of the granulation drum operating in this manner was calculated to be 35 Btu/(hr)(ft$^3$ of granulator volume) (°F.). Full cross sectional sections of the drum which contained a portion of a fan were conservatively calculated to have local Ua values ranging from 30 to 49 Btu/(hr)(ft$^3$ of section volume) (°F.). Full cross sectional sections of the granulator which did not contain fans, but were enhanced by the orientation of the water spray nozzles and the aspirating effect of the granules falling between the pans were calculated to have Ua values between 15 and 20 Btu/(hr)(ft$^3$ of section volume)(°F.). The drum clearly had the capability of additional heat removal provided the supporting equipment was capable and if either more or larger fans were installed in the granulator the overall volumetric heat transfer coefficient, Ua, would certainly be expected to show a major increase.

EXAMPLE III

The granulation drum described earlier was operated without the internal propeller fans, but otherwise in the same manner, as in example II. The test lasted 4½ hours. Heat transfer capabilities of the granulator without internal air movers limited the production rate to about 4000 pounds per hour. Data was obtained which allowed the calculation of Ua values for the granulator operating without any internal air movers. The overall spraying rate of the molten urea was 4020 pounds per hour. Urea recycle and seed granules were fed into the front end of the granulator at rates of 4080 pounds per hour and 150 pounds per hour, respectively. To remove the heat given off by solidifying melt and its subsequent cooling to the temperature of the granules in the granulator, room air was pulled through the granulator, as in examples I and II. The air entered the granulator at a rate of about 2875 cfm. It has a temperature of 77° F. and a relative humidity of 63 percent. Cooling water was atomized into the drum also as in examples I and II. The water spray rate was adjusted to 241 pounds per hour. At equilibrium conditions, the temperature of the exiting granules was measured to be 215° F. The temperature of the exiting air could not be accurately measured because of the heavy concentration of water mist it contained, but said temperature was estimated by a conservation method to be a maximum of 151° F. There were water mist related buildups on the inside shell of the granulator, the exhaust hood of the granulator and the discharge chute from the granulator, making it unadvisable to run the granulator in this manner on a continuous long-term basis. However, the test was done to ascertain the maximum feasible capacity of the granulator and the corresponding overall volumetric heat transfer coefficient, Ua, which could be obtained without internal air moving devices other than the baffling effect of the water nozzles spraying counter to the normal flow of air. The heat transfer rate was 456,000 Btu/hr, 71 percent of that obtained in example II, and Ua for the granulation drum operating in this manner was calculated to be 20 Btu/(hr) (ft$^3$ of granulator volume) (°F.) and found to be fairly constant over the length of the granulator. This stated value of Ua corresponded very closely to the values experienced in example II where the cross sections of the granulator did not contain propeller fans to move the air into the falling granules. This test, when compared with the results of example II, however, shows the need for and advantage of using the propeller fans or other internal air movers, even though the baffling effect of the water nozzles and aspirating effect of the granules falling between the deflector pans provide Ua values which are higher than those forecast by some of the most respected rotary drum design literature.

EXAMPLE IV

The granulation drum described earlier and used in examples I through III was again used to granulate urea at the same rate as in example III. The three 15-inch propeller fans used in examples I and II were again activated to improve the volumetric heat transfer coefficient, Ua, of the rotary granulation drum. Molten urea was sprayed into the drum at the rate of 4020 pounds per hour. The rate at which urea recycle was fed to the granulator was reduced from 4080 pounds per hour, in example III, to 1980 pounds per hour to increase the heat removal load on the granulator. In order to make the granulator even more dependent on recycled air with cooling by water mist evaporation occurring between repeated contacts with the granules, the air flow was reduced from 2875 cfm at 77° F. and 63 percent relative humidity in example III to 2000 cfm at 78° F. and 20 percent relative humidity in this test.

The internal propeller fans were run at maximum speed, about 2000 rpm, to effect the best contact possible between air and granules. The heat transfer rate from granules to air for this example was 543,000 Btu/hr, an increase of 19 percent over example III while the exit temperature of the granules leaving the granulator dropped 12° F. under that obtained in example III to 203° F. The discharge air temperature went up from approximately 151° F. in example III to 175° F. However, the most important indication of heat transfer efficiency, the overall volumetric heat transfer coefficient, Ua, was calculated to be 45 Btu/(hr)(ft$^3$ of granulator volume) (°F.), an increase of 125 percent over that obtained in example III and even an increase of 29 percent over that obtained in example II where the propeller fans were operated at a slightly lower speed. Cross sectional sections of the granulation drum which contained a portion of a fan were conservatively calculated to have Ua values between 28 and 88 Btu/(hr)(ft$^3$ of section volume) (°F.). Cross sectional sections of the granulator which did not contain fans, but were enhanced by the orientation of the water spray nozzles and the aspirating effect of the granules falling between the pans were calculated to have Ua values between 15 and 20 Btu/(hr) (ft$^3$ of section volume) (°F.), the same as in the other examples.

It is again pointed out that we did not have a full complement of internal air movers installed in our rotary drum in any of our tests including examples II and IV. We would project that additional air moving devices can be installed in the manner of the present units to double the air contact with the granules which we provided in examples I, II, and IV, and if this is done, we calculate the Ua values will approach 70 Btu/(hr)(ft$^3$ of granulator volume) (°F.), in a rotary drum. For those who are knowledgeable in air flow design and heat transfer, it can readily be seen that scale-up of our invention to large drums is relatively easy. In one means, three or more deflector pans can be installed in the granulator all in parallel with the axis of the granulator and each other and internal air movers can be positioned to blow air through the openings between the pan and into the section of falling granules. There are many other schemes of scale-up which will also be obvious to the practitioner of our invention and need not be mentioned herein to comply with the spirit if not the content as to the full disclosure of our invention.

EXAMPLE V

With Particle Wetting Prior to Gas Contact and Penetration

In our test work we have made an astounding discovery in the realm of cooling of solid particles such as in granulation which was made possible by the use of this our latest invention and as such is one of the most preferred embodiments of this disclosure. We have now found that it is possible to get tremendous increases in heat removal from the solid particles by controlled wetting of same just prior to forced circulation of air through the segment of same provided they are in a hot state. The air removes the light film of water off the particles because of the increased contact of air and solid particles.

In the earlier disclosure of Shirley, U.S. Pat. No. 4,213,924 supra, it was emphatically pointed out that atomized water droplets were not to be allowed to come into contact with solid particles. Example IV of U.S. Pat. No. 4,213,924, supra, showed the effect of letting moisture impinge on the surface of sulfur particles. Impingement of moisture onto hygroscopic urea was reported to be much more serious resulting in extreme buildup problems in the granulator and retention of moisture in the final product. In this embodiment of our new invention, forced recirculation of air in the previously described manner through the falling particles, some water droplet impingement on urea particles in a controlled manner is no longer a problem and impingement on sulfur and other nonhygroscopic material is greatly desired from a heat removal standpoint. When moisture was lightly sprayed on a hot nonhydroscopic material prior to contact with forced recirculated air by means of a propeller fan, heat removal from the material was greatly increased. Under these conditions, heat removal from the hot particles was not limited by the heat capacity of the air and transfer of heat into the air. The particles carried their own cooling medium, water, which was evaporated into the fast moving air using conducted heat from the particles as the means of evaporating energy. The recirculating air acted only as a medium into which the water vapor flowed. Only slight increases in air temperature were required to maintain high concentration gradients between air and particle surface which enabled sustained high evaporation rates now a function of concentration gradients and only a minor function of heat capacity of the air.

With fans some moisture is almost always blown against the falling particles but the particles discharge from the rotary drum in a considerably drier condition than when the fans are turned off.

Although it is a misnomer to measure cooling in this case by the overall volumetric heat transfer coefficient as there is almost no heat transfer only mass transfer; preliminary indications are that energy transfer rates from the solid particles as measured by evaporating water rates are more than doubled resulting easily in pseudo Ua values of over 50 Btu/hr(ft$^3$)(°F.) when cooling nonhygroscopic materials. This is done without detriment to particles or operation of the granulator. It is pointed out however that some hygroscopic materials have very low moisture vapor pressures even at elevated temperatures and it is still very important to keep these materials free of any moisture; hence, in our claims which will follow, it is necessary to cover situations wherein there is both contact and noncontact of the cooling materials with water. Of course, to those skilled in the art of heat transfer and chemical technology, it is obvious that cooling can be done in an enclosed system with some other readily volatile material such as acetone or one of the various alcohols, where the vaporized material is recovered and recycled by some means. It is further obvious that spraying these materials directly in the falling particles will have the same effect as the spraying of water provided forced recirculation of air is used and spray rates are controlled.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In an improved process for the granulation of materials wherein same is effected in an enclosed vessel by spraying particles of molten material on rapidly moving granules of substrate such that the granules of substrate are increased in size by accretion as the sprayed particles solidify quickly on the surface of said substrate, and wherein at least a substantial amount of the heat of crystallization and associated heat from cooling the molten material and subsequently solid material is removed by evaporation of water in said enclosed vessel into air being moved through said enclosed vessel which comprises:
    (a) atomizing the water to be evaporated in said enclosed vessel into finely divided droplets having a median volume diameter of less than $1.967 \times 10^{-4}$ ft;
    (b) spraying said water droplets with a spray angle, the arc of which is at least 30 degrees;
    (c) spraying said water droplets in such a manner that the liquid water comprising same totally evaporates while in said air in a period of time of less than 2 seconds and from a predetermined juxtaposed position such that no water in the liquid phase contacts either the sprayed particles of molten material or of the substrate granules which are increasing in size by accretion from the solidification of said sprayed particles of molten material, or both;
    (d) controlling the moisture content of said air below the dew point of said air everywhere in said enclosed vessel, below the concentration in said air where condensation would take place on any surface inside said enclosed vessel, and below the concentration in said air where granules of substrate of any size or at any point in said enclosed vessel would absorb water from said air, thus preventing water absorption by said granules of substrate and condensation of water in the air onto the inner surfaces of said enclosed vessel; and (e) removing said heat of crystallization and associated heat from cooling the molten material and subsequently solid material by evaporation of said finely divided droplets of water to give an overall heat transfer rate which is represented in Btu/hr by either the numerator or denominator of the following equation which represents the thermodynamics of the instant process, i.e.

$$\frac{4\pi \bar{r} n(t_a - t_w)(k_f + k_c) + W_a \Delta H_a + W_v \Delta H_v}{h_g N_g A_g (t_g - t_a) + q_i} = 1$$

where $\pi$ is the ratio of the circumference of a circle to its diameter and is 3.1416 and dimensionless; $\bar{r}$ is the average radius in ft. of an evaporating droplet over its life span and is a maximum of $6.56 \times 10^{-5}$ ft; n is the number of water droplets present in atomized form in the vessel at a given instant and as such is dimensionless; $t_a$ is the average dry bulb temperature of the air in °F.; $t_w$ is the average wet bulb temperature of the air in °F.; $t_g$ is the average temperature of granules in contact with the air in °F.; $k_f$ is the thermal conductivity of the air in Btu-ft/(hr)(ft$^2$)(°F.); $k_c$ is the forced thermal convection of air in contact with water droplets in Btu-ft/(hr)(ft$^2$) (°F.); $W_a$ is the mass flow rate of air through the vessel less water evaporated in the vessel in lb/hr; $\Delta H_a$ is the difference in enthalpy of the air entering and leaving the vessel less water evaporated in the vessel in Btu/lb; $W_v$ is the mass flow rate of water sprayed and evaporated in the vessel in lb/hr; $\Delta H_v$ is the average change in enthalpy of the water evaporated in the vessel after it is in the vapor phase in Btu/lb; $h_g$ is the average heat transfer coefficient between granules and air in Btu/(ft$^2$)(hr)(°F.); $N_g$ is the number of granules exposed to the air at any one instant and is dimensionless; $A_g$ is the average surface area of each one of those granules exposed to the air in square feet; and $q_i$ is the rate of heat flow from granules to the air by indirect means in Btu/hr, and where the left hand term of the numerator fully describes the rate of heat transfer by evaporation of water in Btu/hr, and the middle and right hand terms of the numerator fully describe the heat absorbed by the air and the water vapor, respectively, in Btu/hr, and the denominator fully describes the rate of heat transfer from granules to air in Btu/hr;

the improvement in combination therewith for effecting improved heat transfer between the said granulated material in said enclosed vessel and the air introduced therein, which comprises the additional steps of:

(1) alternately causing at least a portion of said movement of granules of substrate in said enclosed vessel to be vertically displaced from and returned from a first zone therein, the angle of the fall line of said granules of substrate in the descending attitude of said vertical displacement for return to said first zone ranging from about 90 degrees to the horizontal to about 5 degrees greater than the angle of repose of said granules of substrate;

(2) causing at least a portion of said air in said enclosed vessel to be moved in a generally horizontal attitude in a manner so as to intersect said granules of substrate in said descending attitude of said vertical displacement for return of same to said first zone, said horizontal movement of said air being sufficient to at least partially penetrate at least a portion of that segment of said enclosed vessel occupied by said returning granules of substrate;

(3) causing at least a portion of said air in said enclosed vessel having intersected and at least partially penetrated said segment of said granules of said substrate therein to be displaced to a second zone in said enclosed vessel, said second zone being at least horizontally displaced away from said granules of substrate;

(4) adjusting the enthalpy of the air displaced into said second zone to predetermined levels to maintain a predetermined temperature differential between said granules of substrate in said enclosed vessel and said air displaced into said second zone; and (5) removing at least a portion of air displaced into said second zone after the enthalpy thereof has been adjusted and returning same into contact with at least a portion of that segment of said enclosed vessel occupied by said returning granular substrate to effect heat transfer therewith by means of at least partial penetration thereof in step 2 above in a manner such that the contact angle between said air and the plane of the fall line of said granular substrate ranges from between about $-45$ degrees to about $+45$ degrees from the direction perpendicular to the plane of said fall line;

said process characterized by the fact that the thermodynamic characteristics thereof as they relate to the heat transfer between said aid and said granular substrate are represented as follows:

$$q_t = Ua\, V(\Delta t)_m$$

where
$q_t$ = total heat transferred in the enclosed vessel, Btu/hr
$Ua$ = volumetric heat transfer coefficient Btu/(hr)(ft$^3$ enclosed vessel)(°F.)
$V$ = volume of the enclosed vessel, ft$^3$
$(\Delta t)_m$ = true mean temperature difference between the air and the granular substrate, °F.

2. In an improved process for the granulation of materials wherein same is effected in an enclosed vessel by spraying particles of molten material on rapidly moving granules of substrate such that the granules of substrate are increased in size by accretion as the sprayed particles solidify quickly on the surface of said substrate, and wherein at least a substantial amount of the heat of crystallization and associated heat from cooling the molten material and subsequently solid material is removed by evaporation of water in said enclosed vessel into air being moved through said enclosed vessel which comprises:

(a) atomizing the water to be evaporated in said enclosed vessel into finely divided droplets having a median volume diameter of less than $1.967 \times 10^{-4}$ ft;

(b) spraying said water droplets with a spray angle, the arc of which is at least 30 degrees;

(c) spraying said water droplets in such a manner that the liquid water comprising same totally evaporates while in said air in a period of time of less than 2 seconds and from a predetermined juxtaposed position such that no water in the liquid phase contacts either the sprayed particles of molten material or of the substrate granules which are increasing in size by accretion from the solidification of said sprayed particles of molten material, or both;

(d) controlling the moisture content of said air below the dew point of said air everywhere in said enclosed vessel, below the concentration in said air where condensation would take place on any surface inside said enclosed vessel, and below the concentration in said air where granules of substrate of any size or at any point in said enclosed vessel would absorb water from said air, thus preventing water absorption by said granules of substrate and condensation of water in the air onto the inner surfaces of said enclosed vessel; and (e) removing said heat of crystallization and associated heat from cooling the molten material and subsequently solid material by evaporation of said finely divided droplets of water to give an overall heat transfer rate which is represented in Btu/hr by either the numerator or denominator of the following equation which represents the thermodynamics of the instant process, i.e., $$\frac{4\pi \bar{r} n(t_a - t_w)(k_f + k_c) + W_a \Delta H_a + W_v \Delta H_v}{h_g N_g A_g(t_g - t_a) + q_i} = 1$$

where $\pi$ is the ratio of the circumference of a circle to its diameter and is 3.1416 and dimensionless; $\bar{r}$ is the average radius in ft. of an evaporating droplet over its life span and is a maximum of $6.56 \times 10^{-5}$ ft; n is the number of water droplets present in atomized form in the vessel at a given instant and as such is dimensionless; $t_a$ is the average dry bulb temperature of the air in °F.; $t_w$ is the average wet bulb temperature of the air in °F.; $t_g$ is the average temperature of granules in contact with the air in °F.; $k_f$ is the thermal conductivity of the air in Btu-ft/(hr)(ft$^2$)(°F.); $k_c$ is the forced thermal convection of air in contact with water droplets in Btu-ft/(hr)(ft$^2$) (°F.); $W_a$ is the mass flow rate of air through the vessel less water evaporated in the vessel in lb/hr; $\Delta H_a$ is the difference in enthalpy of the air entering and leaving the vessel less water evaporated in the vessel in Btu/lb; $W_v$ is the mass flow rate of water sprayed and evaporated in the vessel in lb/hr; $\Delta H_v$ is the average change in enthalpy of the water evaporated in the vessel after it is in the vapor phase in Btu/lb; $h_g$ is the average heat transfer coefficient between granules and air in Btu/(ft$^2$)(hr)(°F.); $N_g$ is the number of granules exposed to the air at any one instant and is dimensionless; $A_g$ is the average surface area of each one of those granules exposed to the air in square feet; and $q_i$ is the rate of heat flow from granules to the air by indirect means in Btu/hr, and where the left hand term of the numerator fully describes the rate of heat transfer by evaporation of water in Btu/hr, and the middle and right hand terms of the numerator fully describe the heat absorbed by the air and the water vapor, respectively, in Btu/hr, and the denominator fully describes the rate of heat transfer from granules to air in Btu/hr;

the improvement in combination therewith for effecting improved heat transfer between the said granulated material in said enclosed vessel and the air introduced therein, which comprises the additional steps of:

(1) alternately causing at least a portion of said movement of granules of substrate in said enclosed vessel to be vertically displaced from and returned from a first zone therein, the angle of the fall line of said granules of substrate in the descending attitude of said vertical displacement for return to said first zone ranging from about 90 degrees to the horizontal to about 5 degrees greater than the angle of repose of said granules of substrate;

(2) causing at least a portion of said air in said enclosed vessel to be moved in a generally horizontal attitude in a manner so as to intersect said granules of substrate in said descending attitude of said vertical displacement for return of same to said first zone, said horizontal movement of said air being sufficient to at least partially penetrate at least a portion of that segment of said enclosed vessel occupied by said returning granules of substrate;

(3) causing at least a portion of said air in said enclosed vessel having intersected and at least partially penetrated said segment of said granules of said substrate therein to be displaced to a second zone in said enclosed vessel, said second zone being at least horizontally displaced away from said granules of substrate; and (4) removing at least a portion of air displaced into said second zone and returning same into contact with at least a portion of that segment of said enclosed vessel occupied by said returning granular substrate to effect further heat transfer therewith by means of at least partial penetration thereof in step 2 above in a manner such that the contact angle between said air and the plane of the fall line of said granular substrate ranges from between about −45 degrees to about +45 degrees from the direction perpendicular to the plane of said fall line;

said process characterized by the fact that the thermodynamic characteristics thereof as they relate to the heat transfer between said aid and said granular substrate are represented as follows:

$$q_t = Ua\ V(\Delta t)_m$$

where $q_t$=total heat transferred in the enclosed vessel, Btu/hr

Ua=volumetric heat transfer coefficient Btu/(hr)(ft$^3$ of enclosed vessel)(°F.)

V=volume of the enclosed vessel, ft$^3$ $(\Delta t)_m$=true mean temperature difference between the air and the granular substrate, °F.

3. The processes of claims 1 or 2 wherein the value of Ua exceeds 25 Btu/(hr)(ft$^3$ of the enclosed vessel)(°F.).

4. The process of claim 3 wherein said enclosed vessel is a rotating cylindrical drum.

5. The process of claim 4 wherein said rotating cylindrical drum is equipped with lifting flights.

6. The process of claim 5 wherein said rotating cylindrical drum equipped with lifting flights is equipped with deflector means, said deflector means positioned within the confines of said drum and being of a length substantially equal to the length of said drum and in a plane substantially parallel with the axis of said drum and a substantial portion of said plane located horizontally above said drum axis.

7. The process of claim 6 wherein said deflector means comprises a plurality of deflector pans, wherein at least the top surface of each pan is substantially parallel with the axis of said drum, the top surface of each pan is sloped downward at an angle of at least about 25 degrees with the horizontal in the direction toward the portion of the shell of said rotating drum moving in an upward direction and at least a portion of the uppermost edge of each of said pans, with the exception of the pan at the highest elevation therein subtending the lower edge of each succeeding pan thereabove.

8. The process of claim 7 wherein the generally horizontal attitude of gas movement intersects and penetrates at least one of the falling curtains of particulate materials formed by the free-fall of same off the lower edge of each pan to the upper edge of each succeeding pan therebeneath.

9. The process of claim 3 wherein the gas moved in said generally horizontal attitude is effected therein by means of a plurality of propeller type fans.

10. The process of claim 4 wherein the gas moved in said generally horizontal attitude is effected therein by means of a plurality of propeller type fans.

11. The process of claim 5 wherein the gas moved in said generally horizontal attitude is effected therein by means of a plurality of propeller type fans.

12. The process of claim 6 wherein the gas moved in said generally horizontal attitude is effected therein by means of a plurality of propeller type fans.

13. The process of claim 7 wherein the gas moved in said generally horizontal attitude is effected therein by means of a plurality of propeller type fans.

14. The process of claim 8 wherein the gas moved in said generally horizontal attitude is effected therein by means of a plurality of propeller type fans.

15. The processes of claims 1 or 2 wherein the molten material is sulfur and where $t_g$ is between 110° F. and 202° F.; $t_a$ is between 80° F. and 190° F.; $t_w$ is between 60° F. and 183° F.; $k_f$ is between 0.0147 and 0.0176 Btu-foot per square foot per hour per °F.; $k_c$ is approximately 0.048 Btu-ft/ft$^2$(hr)(°F.); $W_a/W_v$ is between 1.32 and 300 pounds of dry air per pound of water sprayed; $W_v/V_g$ is between 0.1 and 3 pounds per hour per cubic foot of vessel; $V_g$, which is the volume of the vessel, is between 25 and 10,000 cubic feet; $\Delta H_a$, which is the change in enthalpy of the entering air as it passes through the granulator, is less than about 50 Btu per pound of dry air; $\Delta H_v$, which is the average change in enthalpy of the water evaporated after it is in the vapor phase ranges from about 1.3 to about 52 Btu/lb water; and n, which is the number of droplets, is between about $3.5 \times 10^7$ to about $1.4 \times 10^{10}$.

16. The processes of claims 1 or 2 wherein the molten material is urea and where $t_g$ is between 130° F. and 220° F.; $t_a$ is between 80° F. and 210° F.; $t_w$ is between 60° F. and 144° F.; $k_f$ is between 0.0147 and 0.0170 Btu-foot per square foot per hour per °F.; $k_c$ is approximately 0.048 Btu-ft/ft$^2$(hr)(°F.); $W_a/W_v$ is between 5.59 and 300 pounds of dry air per pound of water sprayed; $W_v/V_g$ is between 0.1 and 4 pounds per hour per cubic foot of vessel; $V_g$, which is the volume of the vessel, is between 25 and 10,000 cubic feet; $\Delta H_a$, which is the change in enthalpy of the entering air as it passes through the granulator is less than about 50 Btu per pound of dry air; $\Delta H_v$, which is the average change in enthalpy of the water evaporated after it is in the vapor phase, ranges from about 1.3 to about 61.7 Btu/lb of water; and n, which is the number of droplets, is between about $4 \times 10^7$ to about $1.6 \times 10^{10}$.

17. The processes of claims 1 or 2 wherein the substrate upon which the sprayed molten material is directed in said enclosed vessel is a material of substantially different chemical makeup from said sprayed molten material such that it is a coating process.

* * * * *